United States Patent [19]

Isomura

[11] 3,730,003
[45] May 1, 1973

[54] RPM REGULATOR FOR INTERNAL COMBUSTION ENGINES, PARTICULARY ENGINES FOR AGGREGATES

[75] Inventor: Takuji Isomura, Kariya, Aichi Pref., Japan

[73] Assignee: Nippondenso Co. Ltd., Kariya-shi, Aichi-ken, Japan

[22] Filed: Sept. 22, 1971

[21] Appl. No.: 182,762

[30] Foreign Application Priority Data

Sept. 28, 1970 Japan..................................45/84812

[52] U.S. Cl....................................................73/541
[51] Int. Cl..............................................F02d 31/00
[58] Field of Search................73/540, 541, 542–543; 290/40 A

[56] References Cited

UNITED STATES PATENTS 2,474,316    6/1949    May et al..........................73/543 X

*Primary Examiner*—James J. Gill
*Attorney*—Edwin E. Greigg

[57] ABSTRACT

In an rpm regulator for an internal combustion engine settable to two operational rpm's for obtaining two different current frequencies from a generator driven by said engine, in order to ensure that the P-degree of the regulator remains the same, there is provided an auxiliary regulator spring which, in an arbitrary manner, is connectable to the rpm regulator to combine with a main regulator spring for one of the operational rpm's.

5 Claims, 2 Drawing Figures

RPM REGULATOR FOR INTERNAL COMBUSTION ENGINES, PARTICULARY ENGINES FOR AGGREGATES

BACKGROUND OF THE INVENTION

This invention relates to an rpm regulator for internal combustion engines, particularly aggregate engines and is of the type which has a governor member displaceable in an rpm-dependent manner by the force of centrifugal weights against the return force of at least one regulator spring.

In some countries the same generators are used for the generation of a 50-cycle current and a 60-cycle current.

Internal combustion engines used for driving such current generators have to meet the following requirements:

1. In order to maintain the frequency obtained from the generator at an approximately constant value, the rpm deviation factor $\delta$ and the degree of proportionality, as the case may be, and referred to hereinafter briefly as the P-degree, has to be 3 percent or less. It is noted that $$\delta = \frac{\text{max. rpm} - \text{predetermined rpm}}{\text{predetermined rpm}} \times 100\%$$

2. For purposes of economy and in order to permit small dimensions and small weight of the entire internal combustion engine, it is necessary that the frequencies of the generated current ($f_1 = 50$ cycles and $f_2 = 60$ cycles) which correspond to the rpm's of the aggregate (for example, $n_1 = 1,500$ rpm, $n_2 = 1,800$ rpm) be controlled by the same regulator.

Due to the change of the aggregate rpm, the pressure force exerted by the centrifugal weights of the rpm regulator also varies. Thus, if the same regulator spring is used for both frequencies, the required P-degree may be obtained only for one aggregate rpm. The P-degree for the other aggregate rpm will be either smaller or greater than the required value. If the P-degree is too small, there is a danger of "hunting" of the engine.

In order to vary the aggregate rpm in a known rpm regulator (such as disclosed, for example, in German Pat. No. 1,011,223), the tension force of the regulator spring has to be varied by changing its angular position. In this manner, the direction of force exerted by the regulator spring and the effective spring constant are changed If, for setting a higher rpm, the tension force of the regulator spring is increased, then simultaneously the direction of the regulator spring force approximates that of the displacement of the governor member. Stated differently, the angle which is defined by the direction of the spring force (determined by the angular position of the regulator spring) and the direction of movement of the governor member will now be smaller. In this manner, the effective spring constant of the regulator spring has been increased. The result is a smaller sensitivity of response to rpm fluctuations. Since the pressure force generated by the centrifugal weights is proportionate to the square of the rpm, at first one would be inclined to say that the P-degree has undergone little change. In reality, however, the increase of the aforenoted pressure force is much too large to be compensated by changing the effective direction of the regulator spring so that, eventually, the P-degree will be much too small.

In order to eliminate the aforediscussed disadvantages, the following countermeasures have been resorted to in known devices:

A. The regulator spring is exchanged for different frequencies;

B. Simultaneously with the change of the angular position of the regulator spring, the tension thereof is changed in such a manner by means of a setscrew that for both aggregate rpm's the P-degree is maintained at the same value.

The aforenoted countermeasures have, however, the disadvantage that in case (A) it is necessary to disassemble the regulator then reassemble and set it, and in case (B) the regulator can be set only with the greatest difficulty in an assembled condition, since the correct position of the setscrew has to be found by trial and error. Therefore, both countermeasures (A) and (B) are problematical in that they may not be performed in a simple manner by the ordinary user of the aggregate.

OBJECT AND SUMMARY OF THE INVENTION

It is an object of the invention to provide an improved rpm regulator of the aforenoted type, wherein the readjustment necessitated in case of frequency switch may be effected by a simple setting without involved assembling or setting operation.

Briefly stated, according to the invention, for the purpose of achieving an identical rpm deviation factor (P-degree) for two ranges of operation ($n_1$, $n_2$), there are used at least one main regulator spring and an arbitrarily connectable auxiliary spring as regulator springs. In one range of operation only the resetting force of the main regulator spring is effective, while in the other range of operation the force of the auxiliary regulator spring is added to the main regulator spring.

In this manner it is achieved that merely by adding or omitting the effective force of the auxiliary spring, the P-degree corresponding to the selected aggregate rpm does not change.

The invention will be better understood as well as further objects and advantages become more apparent from the ensuing detailed specification of a preferred, although exemplary embodiment taken in conjunction with the drawing.

DESCRIPTION OF THE PREFERRED EMBODIMENT

Figure 1:
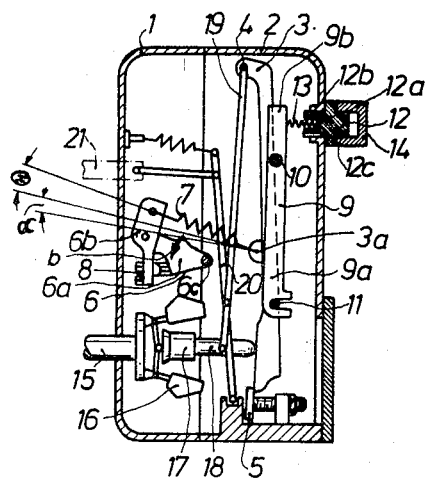
FIG. 1 is a simplified longitudinal sectional view of the preferred embodiment of the invention and FIG. 2 is a diagram illustrating the mode of operation of the rpm regulator according to the invention.

Turning now to FIG. 1, the regulator shown therein has a housing 1 provided with a closure 2. A support lever or force transmitting means 3 which is pivotally secured to a pin 4 affixed to the closure 2 is limited in its clockwise movement by a full load abutment 5. Between a pivotal arm 6 connected to an operating lever (not shown in the drawing) and the support point 3a of the lever 3 there is tensioned a main regulator spring 7, the pull of which may be varied by actuating the aforenoted and not illustrated operation lever. The pivotal lever 6 is formed of a pivotal arm 6a connected with the operating lever by means of a shaft 6c and an arm 6b constituting the securing means for the main regulator spring 7. The arm 6b permits a precise setting, by means of a setscrew 8, of the angle between the arm 6b and the pivotal arm 6a. In this manner the tension force of the main regulator spring 7 is accurately determined.

A two-arm auxiliary lever 9, having lever arms 9a and 9b, is rotatably supported by a bearing 10 affixed to the closure 2. The lever arm 9a is pivotable about a pin 11 affixed to the support lever 3. In the range of the lever arm 9b, there is disposed a threaded plug 12 having a threaded portion 12b engaged in the closure 2. The threaded portion 12b has a blind bore 12a into which there is inserted an auxiliary regulator spring 13 engaging the upper terminus of the lever arm 9b. A closure cap 14 is threadedly engaged on a second threaded portion 12c on the other side of the threaded plug 12.

A cam shaft 15 of a fuel injection pump (not shown) rotates synchronously with the internal combustion engine and actuates centrifugal weights 16, the pressure force of which is transmitted by means of a governor member 17, 18 formed of a sleeve 17 and a setting pin 18. There is further shown a guide lever 19, a control lever 20 and a fuel quantity control rod 21 of the fuel injection pump.

OPERATION OF THE PREFERRED EMBODIMENT

Figure 2:
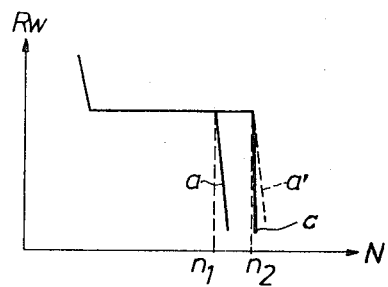

In order to set an rpm $n_1$ for the lower rpm range, that is, an engine rpm at which the frequency of the current generated by the generator should be $f_1 = 50$ cycles, first the pivotal lever 6 has to be brought into its position shown in FIG. 1. Thereafter, the threaded plug or spring supporting means 12 is screwed into the closure 2 with the threaded portion 12c, while the cap 14 is screwed on the threaded portion 12b. Thus, the threaded plug 12 is oriented oppositely to what is illustrated in FIG. 1. The blind bore, with the auxiliary spring 13 is at the outside of closure 2 and is covered by the cap 14. In this condition the axially working pressure force of the centrifugal weights 16 is balanced exclusively by the force of the main regulator spring 7 and, as it may be observed in FIG. 2, a regulating characteristic $a$ is obtained which corresponds to the fixed P-degree. It is noted that in FIG. 2 the ordinate indicates the control displacements Rw of the fuel quantity control rod 21, whereas the abscissa indicates the engine rpm N.

IN order to set the rpm to the higher value $n_2$ necessary to obtain a current frequency of $f_2 = 60$ cycles, the pivotal lever 6 is turned in the direction of arrow $b$ about its axis 6c, whereby the tension force of the main regulator spring 7 is increased. In this manner the work angle of the main regulator spring 7 is displaced by an angle $\theta$ and thus the spring constant affecting the governor member 17, 18 will be greater. The increase of the pressure force exerted by the centrifugal weights 16 for the rpm $n_2$ is, however, very substantially greater than the aforenoted change in the spring constant. THus, one obtains, shown by the solid line $c$ in FIG. 2, a very substantially steeper regulating characteristic and therefore the P-degree now lies significantly below the fixed value.

In order to eliminate the aforenoted disadvantage (i.e. the undesired drop in the P-degree), according to the invention the threaded plug 12 is inserted into the closure 2 in such a manner that it assumes a position shown in FIG. 1. In this position the auxiliary spring 13 engages the upper terminus 9b of the auxiliary lever 9. Simultaneously with adding the supplemental force of the auxiliary regulator spring 13, the effective tension force of the main regulator spring 7 is decreased. For cancelling this effect, the pivotal lever 6 and thus the spring 7 has to be turned through an angle $\alpha$ additionally in the direction of the arrow $b$ whereby the tension force of the main regulator spring 7 is corrected.

To simplify the present description and, at the same time, to present it in a clear fashion, the pivotal lever 6 was displaced in two steps ($\theta + \alpha$). In practice, the effect the auxiliary spring 13 has on the main regulator spring 7 is determined in advance, so that the lever 6 is displaced in a single setting motion from its position shown in FIG. 1 through an angle ($\theta + \alpha$).

If the auxiliary spring 13 is incorporated in the structure in a manner as shown in FIG. 1 then, after the engine rpm has attained the predetermined rpm value $n_2$ and exceeds the same, the setting pin 18 is displaced towards the right. As a result, the force of the auxiliary regulator spring 13 gradually decreases so that the force which is a combination of the pressure force of the centrifugal weights 16 and the force of the auxiliary regulator spring 13 and which displaces the support lever 3 counterclockwise, will be relatively smaller than in the other instance, where the pressure force of the centrifugal weights 16 alone opposed the force of the main regulator spring 7. For this reason, the regulator characteristic according to the invention follows, in case of a determined rpm $n_2$, the broken curve $a'$ in FIG. 2. The regulator characteristic $a'$ at $n_2$ is thus equal to the regulator characteristic $a$ at the predetermined rpm $n_1$, so that in both cases the P-degree and the rpm deviation factor are identical.

The positioning of the auxiliary regulator spring 13 is not limited to the preferred embodiment described hereinabove. For example, the upper terminus 9b of the auxiliary lever 9 could be arranged at an angle with respect to the housing 1, so that the threaded plug 12 could be screwed into the housing 1 from above. Further, it would also be possible to add or omit the additional force of the auxiliary regulator spring 13 from the outside by means of a lever assembly. It would also be feasible to design the auxiliary regulator spring 13 as a tension spring so that in such a case, contrary to the example described hereinbefore, the combined force of the main regulator spring 7 and the auxiliary regulator spring 13 would become effective at the low rpm setting $n_1$.

It was seen that according to the invention a main regulator spring and an auxiliary regulator spring are used as regulator springs. Since in one operational range of the two-range generator (50 and 60 cycles), solely the effective force of the main regulator spring counterbalances the effective force exerted by the centrifugal weights, while in the other operational range the effective balancing force is supplied by the combination of the main regulator spring and the auxiliary regulator spring, it is possible to bring the P-degree both at the low rpm (50 cycles) and also at the high rpm (60 cycles) to the same predetermined fixed value by adding or omitting the effective force of the auxiliary regulator spring. The inclusion or omission of the effective force of the auxiliary regulator spring may be effected from the outside of the regulator in a simple and reliable manner.

What is claimed is:

1. In an rpm regulator for an internal combustion engine, said engine being adapted to be set to operate in either one of two rpm ranges, the improvement comprising
   A. a displaceable governor member,
   B. means exerting an rpm-dependent force on said governor member to displace the same,
   C. a main regulator spring,
   D. force transmitting means operatively connecting said main regulator spring to said governor member to cause the force of said main regulator spring to oppose said rpm-dependent force,
   E. an auxiliary regulator spring,
   F. spring supporting means carrying said auxiliary regulator spring,
   G. housing means and
   H. means for receiving said spring supporting means by said housing means in a first position corresponding to one of said rpm ranges, in said first position said auxiliary regulator spring is operatively connected at least indirectly to said force transmitting means for combining the forces of said main and said auxiliary regulator springs and in a second position corresponding to the other of said rpm ranges, in said second position said auxiliary spring is disconnected from said force transmitting means for rendering said auxiliary spring ineffective.

2. An improvement as defined in claim 1, wherein said force transmitting means includes a pivotal support lever engaged by said governor member, said auxiliary spring, when operatively connected to said main regulator spring, is at least in indirect engagement with said support lever and opposes the force of said main regulator spring.

3. An improvement as defined in claim 1, including a plug constituting said spring supporting means, and means for threadedly receiving said plug in arbitrarily reversible positions corresponding to said first and second positions.

4. An improvement as defined in claim 2, including an auxiliary lever pivotally supported in said housing means and engaging said support lever, said auxiliary spring, in its operative position, engaging said auxiliary lever and being disengaged therefrom in its inoperative position.

5. An improvement as defined in claim 4, wherein said auxiliary lever is formed of a first arm connected to said support lever and a second arm engaged by said auxiliary spring in the operative position of the latter.

* * * * *